United States Patent [19]

Omiya

[11] Patent Number: 4,504,656

[45] Date of Patent: Mar. 12, 1985

[54] ESTERIFIED CARBOXYMETHYL CELLULOSES

[75] Inventor: Takeo Omiya, Himeji, Japan

[73] Assignee: Daicel Chemical Industries, Ltd., Osaka, Japan

[21] Appl. No.: 527,748

[22] Filed: Aug. 30, 1983

[30] Foreign Application Priority Data

Sep. 1, 1982 [JP] Japan .................................. 57-152947

[51] Int. Cl.³ ............................................. C08B 13/00
[52] U.S. Cl. ...................................... 536/66; 536/98; 106/169; 106/187; 106/191; 106/197.1
[58] Field of Search .................................. 536/66, 98

[56] References Cited

U.S. PATENT DOCUMENTS 2,912,430  11/1959  Kosche ............................. 536/66
3,789,117  1/1974   Tsujino ............................ 536/66
3,896,108  7/1975   Klug ............................... 536/98
4,311,833  1/1982   Namikoshi et al. ................. 536/98

Primary Examiner—Ronald W. Griffin
Attorney, Agent, or Firm—Hubbell, Cohen, Stiefel & Gross

[57] ABSTRACT

New esterified carboxymethyl celluloses in which DS by carboxymethyl group per anhydroglucose unit is 2.0 or more, the ester group is a hydrocarbon residue having 1–8 carbon atoms such as methyl, ethyl, n-octyl or benzyl group, DS by esterified carboxymethyl group per anhydroglucose unit is 1.50 or more and the remaining unsubstituted carboxymethyl groups are in the form of free acid and which are soluble in various polar or non-polar organic solvents and are useful as ingredients of paints of enteric coating materials.

10 Claims, 4 Drawing Figures

(cm⁻¹)

ESTERIFIED CARBOXYMETHYL CELLULOSES

BACKGROUND OF THE INVENTION

1. Field of the Invention

The present invention relates to novel esterified carboxymethyl celluloses soluble in organic solvents. More particularly the invention relates to novel esterified carboxymethyl celluloses soluble in organic solvents, having a degree of substitution by carboxymethyl group of 2.00 or more and a degree of substitution by an esterified carboxymethyl group of 1.50 or more.

2. Brief Description of the Prior Art

Carboxymethyl cellulose (hereinafter abbreviated as CMC) is an cellulose ether which is prepared by reacting cellulose with monochloroacetic acid in the presence of alkali. It is a water-soluble high molecular electrolyte widely used as viscosity-increasing agent, dispersing agent, protective colloid, adhesive or the like. As CMC those having a degree of substitution (hereinafter abbreviated as DS) by carboxymethyl group of 0.5 to 1.7 are popular, and they are commercially available usually in the form of sodium salt and partly in the form of ammonium salt or calcium salt. The calcium salt is insoluble in water and it is used mainly as disintegrator. Thus CMC is used as a water-soluble high molecular electrolyte for various purposes. However, such known CMCs have a big defect that they are hardly soluble in any organic solvent.

As a method of making CMC soluble in organic solvents, there can be considered a process of converting it into an esterified CMC by reacting the carboxymethyl groups of CMC with an alcohol, an alkyl halide, an epoxy compound or the like. By esterification of commercially available CMC harving a DS less than 2.00, however, any esterified CMC soluble in organic solvents was not prepared. The product obtained was slightly swollen and hardly dissolved in organic solvents. Although there can be mentioned Japanese Patent Publication No. Sho 45-36143 and Japanese Laid-open Patent No. Sho 49-18981 as examples of the preparation of an esterified CMC, the products disclosed there are both a water-soluble esterified CMC.

SUMMARY OF THE INVENTION

The present invention provides novel esterified carboxymethyl celluloses soluble in organic solvents, characterized in that (1) the degree of substitution by carboxymethyl group per anhydroglucose unit is 2.00 or more, (2) the ester group is a hydrocarbon residue having 1 to 8 carbon atoms, (3) the degree of substitution by the esterified carboxymethyl group per anhydroglucose unit is 1.50 or more, and the remaining unsubstituted carboxymethyl groups are in the form of free acid, and (4) the degree of polymerization is 20 to 700.

DESCRIPTION OF THE PREFERRED EMBODIMENTS

Figure 1:
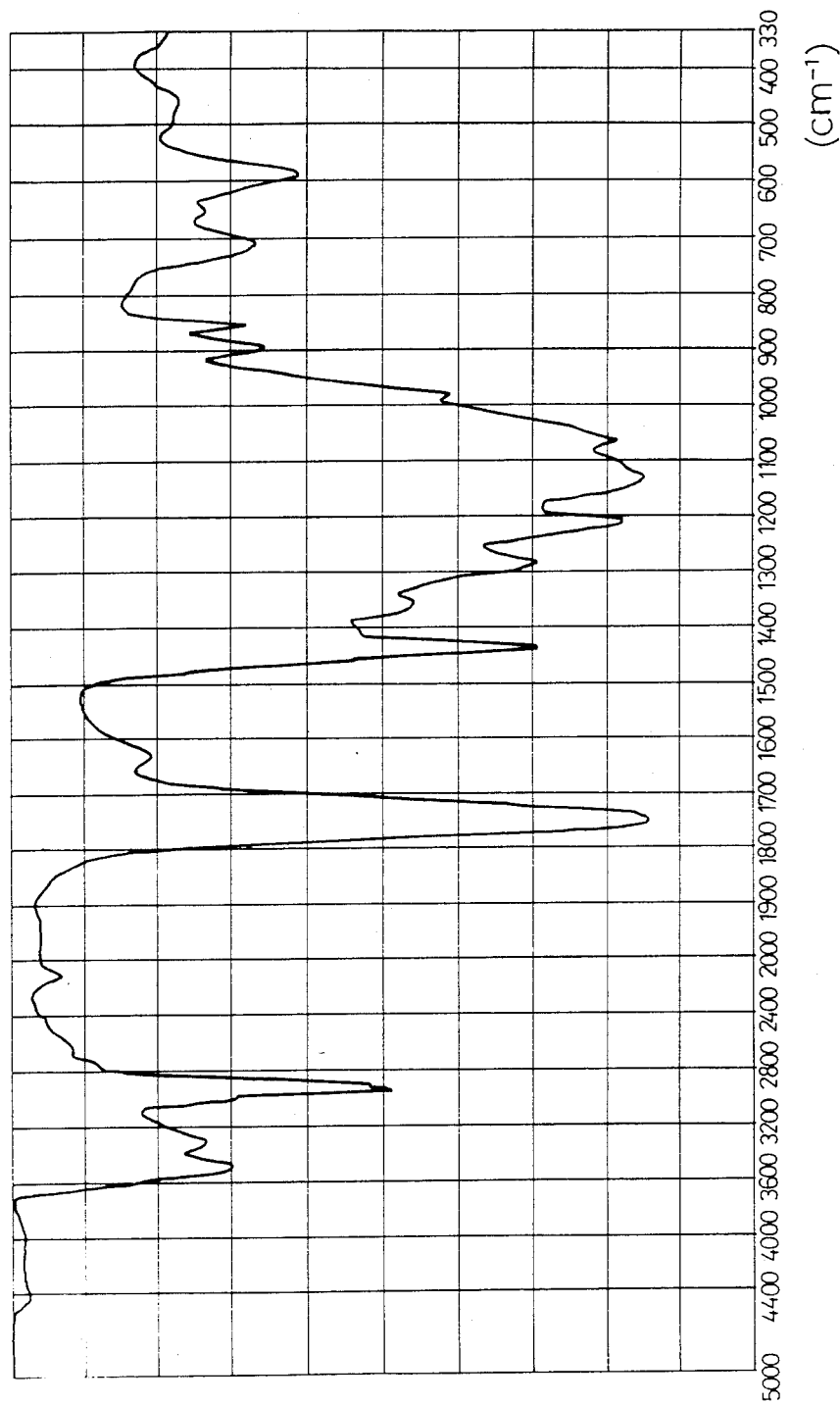
FIG. 1 is a spectrogram showing the infrared absorption spectrum of the methylesterified CMC obtained by Example 1.

Now referring to the preferred embodiments, the present invention is explained in detail.

In this specification, "soluble in organic solvents" means that a substance is soluble in a polar organic solvent such as dimethyl sulfoxide (hereinafter abbreviated as DMSO), tetrahydrofuran (hereinafter abbreviated as THF), acctone, acetylacetone, etc. or a nonpolar organic solvent such as n-hexane, benzene, etc. in an amount of at least 1%.

The esterified CMCs of the present invention have a DS by carboxymethyl group per anhydroglucose unit of 2.0 or more. This means that they have usually such DS in the range of 2.0 to 3.0, preferably, in the range of 2.0 to 2.9. For example, they have such DS of 2.0, 2.2, 2.4, 2.6 or 2.8. Further, they have a DS by an esterified carboxymethyl group per anhydroglucose unit of 1.50 or more, which usually is in the range of 1.50 to 3.0, preferably, in the range of 1.50 to 2.90. For example, they have such DS of 1.50, 1.80, 2.10, 2.40 or 2.80.

Although DS by carboxymethyl group and DS by esterified carboxymethyl group per anhydroglucose unit of the esterified CMCs of the present invention are measured according to the methods as described afterwards, the values obtained by such methods may include errors amounting to ±several percentages. Therefore, even if a value obtained for DS by esterified carboxymethyl group per anhydroglucose unit were, for example, such one that is smaller than 1.5 by a numerical value within the range of measuremental error, the value obtained would be within the range of DS values for the esterified CMCs of the present invention. This applies also for the DS values of the starting material CMCs.

As the ester group which is a hydrocarbon residue having 1 to 8 carbon atoms, there can be mentioned a linear or branched chain alkyl group such as methyl group, ethyl group, n-propyl group, iso-propyl group, n-butyl group, sec-butyl group, tert-butyl group, n-pentyl group, n-hexyl group, n-heptyl group, n-octyl group or the like, or a cyclic hydrocarbon residue such as benzyl group, cyclo hexyl group or the like.

When the ester group is a relatively lower alkyl group such as methyl, ethyl or n-propyl group, the esterified CMC of the present invention is soluble in a polar solvent as described above. When the ester group is a relatively higher alkyl group such as n-hexyl group, n-octyl group or the like, the esterified CMC of the present invention is soluble not only in said polar solvent but also in a non-polar solvent as described above.

Thus it is considered that the solubility in organic solvents of the esterified CMCs of the present invention results from complete extinction of the crystallizability based on the hydrogen bond of cellulose, the starting material of CMC, and the like by the DS by carboxymethyl group of 2.00 or more of the starting CMC and increase of the lipophilic property by esterification of carboxymethyl group with hydrophobic group up to a DS of 1.5 or more.

The present invention provides also a process for the preparation of esterified CMCs which comprises reacting a CMC having a DS of 2.0 or more or a salt thereof with an alcohol having 1 to 8 carbon atoms in the presence of an inorganic acid as catalyst to obtain the esterified CMCs as described above of the present invention.

The salt of CMC having a DS of 2.0 or more, which is used as the starting material of the process of this invention, can be obtained relatively easily by the known process [Canadian Journal of Research, 28, sec. B, P731–736 (1950)] or the process of Japanese Patent Application No. Sho 57-60576.

As the salt of CMC which may be used as the starting material, there can be mentioned an alkali-metal salt such as sodium salt, potassium salt, etc., ammonium salt, calcium salt or the like. Among these salts, sodium salt is preferred.

As the alcohol having 1 to 8 carbon atoms which is used in the process of the present invention, there can be mentioned a linear or branched chain alkyl alcohol such as methyl alcohol, ethyl alcohol, n-propyl alcohol, iso-propyl alcohol, n-butyl alcohol, sec-butyl alcohol, tert-butyl alcohol, n-amyl alcohol, iso-amyl alcohol, n-hexyl alcohol, n-heptyl alcohol, n-octyl alcohol or the like, or a cyclic alcohol such as benzyl alcohol, cyclohexyl alcohol or the like. When a relatively lower alcohol such as methyl alcohol, ethyl alcohol, n-propyl alcohol or the like is used, the alkyl-ester obtained is soluble in polar solvents as mentioned above. The esters obtained by using a relatively higher alcohol such as n-hexyl alcohol or n-octyl alcohol are soluble not only in polar solvents as mentioned above but also in non-polar solvents as mentioned above. The alcohol is selected properly in accordance with the use of the product.

As the inorganic acid used as catalyst in the process of the present invention, there can be mentioned sulfuric acid, hydrochloric acid, nitric acid and phosphoric acid of high concentration. More concretely, 90%–98% sulfuric acid, 25%–45% hydrochloric acid, 40%–80% nitric acid or 70%–95% phosphoric acid is used. When an esterified CMC having a high DS by esterified carboxymethyl group is desired, it is advantageous to use sulfuric acid. On the other hand, when it is desired to adjust said DS at a proper value of 1.50 or more, the reaction is performed using hydrochloric acid, nitric acid or phosphoric acid in the presence, if necessary, of a proper amount of pure water (for example, distilled water). The smaller the amount of acid used is, the less the degree of polymerization of CMC lowers advantageously.

The process of the present invention is characterized by using an inorganic acid as mentioned above as the catalyst for esterification. Therefore, it is easy to effect the conversion into acid form and the esterification simultaneously, using a salt of CMC as the starting material. The esterified CMCs of the present invention are obtained also by direct esterification of CMC in acid form.

The inorganic acid is used in th process of the present invention usually in an amount of about 1.01 to 2.0 equivalents per equivalent of carboxyl group when a salt of CMC is used as the starting material, and about 0.01 to 1.0 equivalent per equivalent of carboxyl group when CMC in acid form is used as the starting material.

The alcohol may be used in the process of the present invention in an amount of 2 or more equivalents per equivalent of carboxyl group in the starting material CMC. However, since the reaction mixture changes from slurry to dope and its viscosity increases significantly, as the reaction proceeds, it is preferred to use the alcohol in amount of 2 to 15 times by weight of the starting material CMC in order to perform stirring and mixing easily. The reaction is carried out at a temperature from room temperature to 100° C. for 0.1 to 10 hours.

After completion of the reaction, the reaction mixture is reprecipitated in pure water or water-containing methyl alcohol to obtain crude esterified CMC. The latter is purified by washing it with about 30 times amount of pure water or water-containing alcohol to give esterified CMC of the present invention.

The esterified CMCs of the present invention are soluble in various polar or non-polar solvents, as described above, and so they would be useful as ingredients of paint and varnish which are requested to be soluble in various solvents.

As cellulose derivatives used hitherto for paint and varnish, there can be mentioned nitrocellulose, acetylcellulose, etc. However, there is a problem about the heat resisting property of nitrocellulose (explosion at 180° C.) and, as for acetylcellulose, there is a problem that it is inferior in the solubility in those solvents having a high boiling point, such as methyl isobutyl ketone or the like.

The esterified CMCs of the present invention are superior in their solubilty in organic solvents, as described above. Moreover, they have no explosive property, not alike nitrocellulose. Therefore, they are expected to be valuable as ingredients of paint and varnish.

Further, the esterified CMCs of the present invention have reactive free acid in the form of carboxymethyl group at a DS value of usually about 0.05 to 1.45. Therefore, they are valuable as intermediates for preparing new derivatives by reacting such highly reactive free acid with another agent. For example, they are valuable for immobilization of enzymes, and so on.

Furthermore, the esterified CMCs of the present invention, especially the ethylesterified CMC, are easily dissolved in an alkaline water, though they are insoluble in an acidic water or neutral water. Therefore, they are valuable as enteric coating material. That is, enteric preparations coated with them are not dissolved by gastric juice which is acidic, but dissolved by intestinal juice which is alkaline, whereby the effects of the preparations are shown to the full.

In the following, the esterified CMCs of the present invention and the process for the preparation of them are explained by giving Examples. The invention, however, shall not be limited to them. In the description of these Examples, "parts" represents parts by weight and "%" represents % by weight.

EXAMPLE 1

In a separable flask of 1 l volume provided with a stirrer and a reflux condenser, 50 parts of sodium CMC having a DS of 2.95 and a degree of polymerization of 350 and 500 parts of 99% methyl alcohol were charged. The reaction was performed at 20° to 40° C. for 1 hour by adding 28.3 parts of 96% sulfuric acid to the mixture while stirring and cooling. Then the reaction mixture was poured into 5 l of pure water while stirring vigorously. Crude methyl-esterified CMC so precipitated was collected by filtration. Next, the crude methyl-esterified CMC was washed well with about 3000 ml of pure water and then dried at room temperature under reduced pressure, whereby 43 parts of methyl-esterified CMC were obtained.

The methyl-esterified CMC had the following characteristics:

(1) DS by carboxymethyl group in acid form of  0.71,
(2) DS by methyl-esterified carboxymethyl group of  2.24,
(3) Degree of polymerization of  170, and
(4) Infrared absorption spectrum analysis as shown in FIG. 1.

Wave numbers and assignments of the main absorption bands were as follows:

| (Wave number) [cm$^{-1}$] | (Assignment) |
|---|---|
| 2960 | —CH$_3$ |
| 1720–1770 | —COO— (ester and carboxylic acid) |
| nearby 1100 | —C—O— (ether, erter, carboxylix acid) |

The methyl-esterified CMC was completely dissolved in an organic solvent such as DMSO, THF, dioxane, acetone or the like to give 1% solution.

EXAMPLE 2

In a separable flask of 1 l volume provided with a stirrer and a reflux condenser, 50 parts of sodium CMC having a DS of 2.95 and a degree of polymerization of 350 and 500 parts of 99% ethyl alcohol were charged. The reaction was performed at 20° to 40° C. for 1 hour by adding 57.4 parts of nitric acid (purity 61%) to the mixture while stirring and cooling. Then the reaction mixture was poured into 5 l of pure water while stirring vigorously. Crude ethyl-esterified CMC so precipitated was collected by filtration. Next, the crude ethyl-esterified CMC was washed with about 3000 ml of pure water and then dried at room temperature under reduced pressure, whereby 44 parts of ethyl-esterified CMC were obtained.

Figure 2:
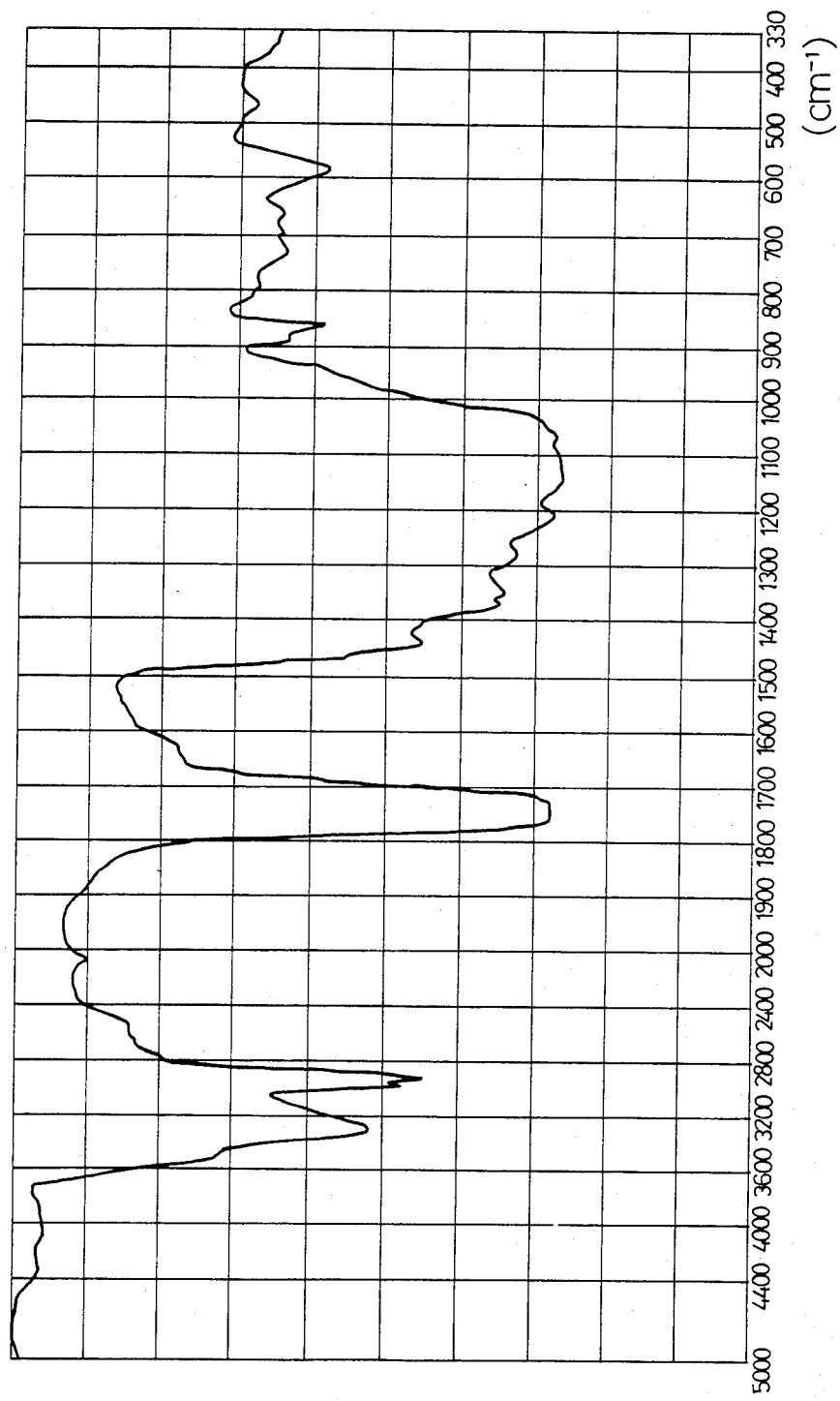
FIG. 2 is a spectrogram showing the infrared absorption spectrum of the ethylesterified CMC obtained by Example 2.

The ethyl-esterified CMC had the following characteristics:

(1) DS by carboxymethyl group in acid form of  0.86,
(2) DS by ethyl-esterified carboxymethyl group of  2.09,
(3) Degree of polymerization of  250, and
(4) Infrared absorption spectrum analysis as shown in FIG. 2.

Wave numbers and assignments of the main absorption bands were as follows:

| (Wave number) [cm$^{-1}$] | (Assignment) |
|---|---|
| 2960 | —CH$_3$ |
| 2925, 2850, 1470 | —CH$_2$— |
| 1720–1770 | —COO— ester and carboxylic acid) |
| nearby 1100 | —C—O— (ether, ester, carboxylic acid) |

The ethyl-esterified CMC was completed dissolved in an organic solvent such as DMSO, THF, dioxane, acetone, ethyl alcohol or the like to give 1% solution.

EXAMPLE 3

In a separable flask of 1 l volume provided with a stirrer and a reflux condenser, 50 parts of sodium CMC having a DS of 2.95 and a degree of polymerization of 350 and 500 parts of 98% n-octyl alcohol were charged. The reaction was performed at 20° to 40° C. for 4 hours by adding 28.3 parts of 96% sulfuric acid to the mixture while stirring and cooling. Then the reaction mixture was poured into 5 l of 75% aqueous methyl alcohol while stirring vigorously. Crude n-octyl-esterified CMC so precipitated was collected by filtration. Next, the crude n-octyl-esterified CMC was washed with about 3000 ml of 75% aquious methyl alcohol and then dried at room temperature under reduced pressure, whereby 53 parts of n-octyl-esterified CMC were obtained.

Figure 3:
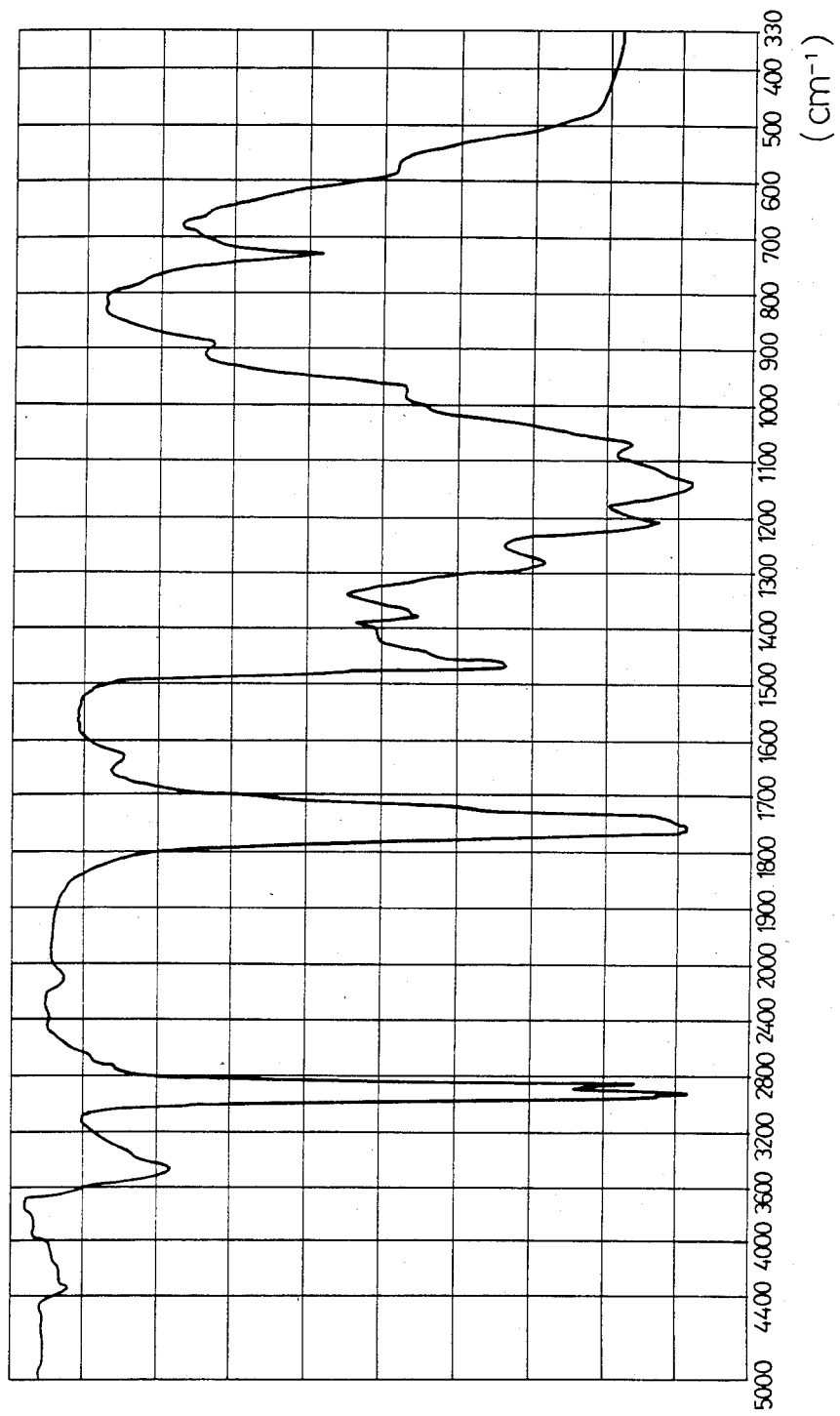
FIG. 3 is a spectrogram showing the infrared absorption spectrum of the n-octylesterified CMC obtained by Example 3.

The n-octyl-esterified CMC had the following characteristics:

(1) DS by carboxymethyl group in acid form of  0.19,
(2) DS by n-octyl-esterified carboxymethyl group of  2.76,
(3) Degree of polymerization of  120, and
(4) Infrared absorption spectrum analysis as shown in FIG. 3.

Wave numbers and assihnments of the main absorption bands were as follows:

| (Wave number) [cm$^{-1}$] | (Assignment) |
|---|---|
| 2960 | —CH$_3$ |
| 2925, 2850, 1470 | —CH$_2$— |
| 1720–1770 | —COO— (ester, carboxylic acid) |
| nearby 1100 | —C—O— (ether, ester, carboxylic acid) |

The n-octyl-esterified CMC was completely dissolved in DMSO, THF, dioxane, acetone, benzene or n-hexane to give 1% solution.

EXAMPLE 4

In a separable flask of 1 l volume provided with a stirrer and a reflux condenser, 50 parts of sodium CMC having a DS of 2.95 and a degree of polymerization of 350 and 500 parts of 98% benzyl alcohol were charged. The reaction was performed at 20° to 40° C. for 4 hours by adding 28.3 parts of 96% sulfuric acid to the mixture while stirring and cooling. Then the reaction mixture was poured into 5 l of 75% aqueous methyl alcohol while stirring vihorously. Crude benzyl-esterified CMC so precipitated was collected by filtration. Next, the crude esterified CMC was washed with about 3000 ml of pure water and then dried at room temperature under reduced pressure, whereby 48 parts of benzyl-esterified CMC were obtained.

Figure 4:
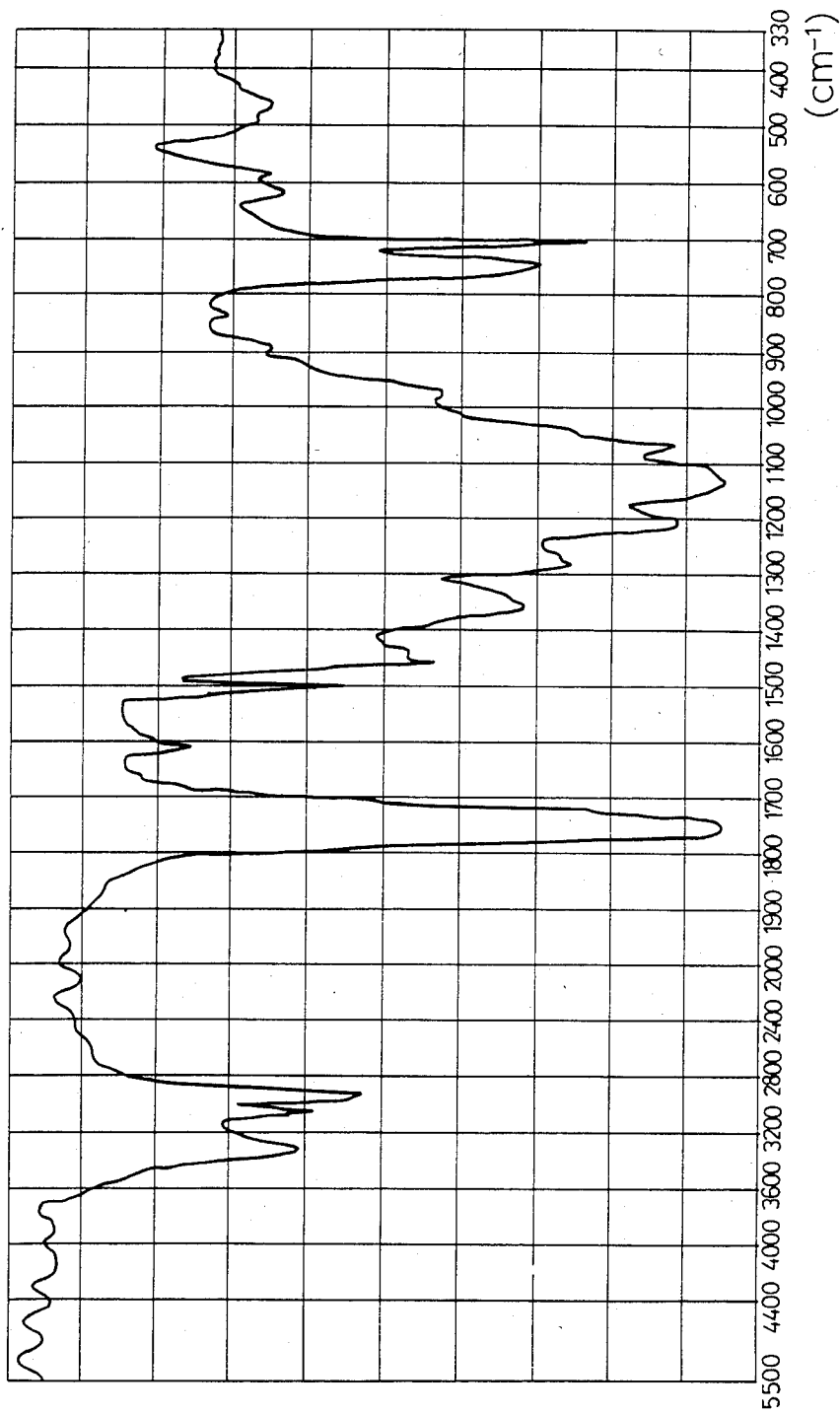
FIG. 4 is a spectrogram showing the infrared absorption spectrum of the benzylesterified CMC obtained by Example 4.

The benzyl-esterified CMC had the following characteristics:

(1) DS carboxymethyl group in acid form of  1.42,
(2) DS by benzyl-esterified carboxymethyl group of  1.53,
(3) Degree of polymerization of  140, and
(4) Infrared absorption spectrum analysis as shown in FIG. 4.

Wave numbers and assignments of the main absorption bands were as follows:

| (Wave number) [cm$^{-1}$] | (Assignment) |
|---|---|
| nearby 3050 | 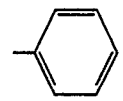 |
| 2925, 2850 | —CH$^2$— |
| 1720–1770 | —COO— (ester, carboxylic acid) |
| nearby 1100 | —C—O— (ether, ester, carboxylic acid) |

The benzyl-esterified CMC was completely dissolved in an organic solvent such as DMSO, THF, dioxane, acetone or the like to give 1% solution.

EXAMPLES 5–8 and COMPARISON EXAMPLES 1–3

Esterified CMCs of Examples 5–8 and Comparison Examples 1–3 were obtained by carrying out the same process for the preparation, purification and drying as Example 1, but changing the kind and amount of sodium CMC and acid and the amount of pure water and methyl alcohol.

The kinds and amounts of the reagents used and the amounts, results of analysis and solubilities in organic solvents of the esterified CMCs obtained of the Examples 5–8 and the Comparison Examples 1–3 are listed in Table 1. The products of the Comparison Examples 1–3 were not soluble in organic solvents and so their degree of substitution and degree of polymerization could not be measured.

TABLE 1

| | Sodium CMC | | | Acid | | Pure water | Methyl-esterified CMC | | | | |
|---|---|---|---|---|---|---|---|---|---|---|---|
| | | Degree of polymerization | Methyl alcohol Amount used (part) | | Amount used (part) | Amount added (part) | Degree of substitution (DS) | | Solubility in organic solvent (1% solution) | Degree of polymerization | Yield (part) |
| | DS | | | Kind | | | Acid form DS | Ester form DS | | | |
| Example 5 | 2.61 | 450 | 50 | 500 | 96% H₂SO₄ | 25.0 | 0 | 0.29 | 2.32 | Completely soluble in DMSO, THF, dioxane, acetone | 190 | 40 |
| Example 6 | 2.19 | 540 | 50 | 500 | 96% H₂SO₄ | 25.0 | 0 | 0.20 | 1.99 | Completely soluble in DMSO, THF, dioxane, acetone (slightly turbid) | 270 | 41 |
| Comparison Example 1 | 1.92 | 560 | 50 | 500 | 96% H₂SO₄ | 25.0 | 0 | — | — | Slightly swollen but not dissolved in DMSO | — | 43 |
| Example 7 | 2.95 | 350 | 50 | 400 | 61% HNO₃ | 57.4 | 100 | 1.40 | 1.55 | Completely soluble in dioxane, acetone (slightly turbid) | 260 | 38 |
| Comparison Example 2 | 2.95 | 350 | 50 | 350 | 61% HNO₃ | 57.4 | 150 | — | — | Swollen but not dissolved in DMSO | — | 37 |
| Example 8 | 2.19 | 540 | 50 | 450 | 61% HNO₃ | 42.6 | 50 | 0.63 | 1.56 | Completely soluble in dioxane, acetone (slightly turbid) | 350 | 39 |
| Comparison Example 3 | 2.19 | 540 | 50 | 350 | 61% HNO₃ | 42.6 | 150 | — | — | Slightly swollen but not dissolved in DMSO | — | 40 |

EXAMPLE 9

In a separable flask of 1 l volume provided with a stirrer and a reflux condenser, 50 parts of sodium CMC having a DS of 2.95 and a degree of polymerization of 350, 500 parts of 199% acetone and 12 parts of pure water were charged. Then 38 parts of 61% nitric acid were added to the mixture while stirring, and the stirring was continued at about 55° C. for 3 hours. From the resulting mixture, crude CMC in acid form was obtained by filtration with glass filter. Then, the crude CMC was washed with 526 parts of 95% aqueous acetone for 1 hour at 40° C. and again collected by filtration with glass filter. It was further washed with 300 parts of 100% acetone for 30 minutes at room temperature, collected by filtration and then dried at room temperature for 24 hours under reduced pressure, whereby 41 parts of CMC in acid form were obtained.

Next, 41 parts of the CMC in acid form and 500 parts of 99% methyl alcohol were charged in a separable flask of 1 l volume provided with a stirrer and a reflux condenser, and the reaction was performed at 20° to 40° C. for 30 minutes by adding 4.8 parts of 96% sulfuric acid to the mixture while stirring and cooling. Then the reaction mixture was poured into 5 l of pure water while stirring vigorously. Crude methyl-esterified CMC so precipitated was collected by filtration. Next, the crude methyl-esterified CMC was washed with about 3000 ml of pure water and then dried at room temperature under reduced pressure, whereby 40 parts of methyl-esterified CMC were obtained.

The methyl-esterified CMC had the following characteristics:

| | | |
|---|---|---|
| (1) | DS by carboxymethyl group in acid form of | 0.15 |
| (2) | DS by methyl-esterified carboxymethyl group of | 2.80 |
| (3) | Degree of polymerization of | 150. |

Finally, the test methods or methods of measurement are outlined.

(1) Degree of substitution (DS) by carboxymethyl group (of a sodium CMC)

1 g of a sodium CMC is precisely weighed and incinerated in a porcelain crucible at 600° C. The sodium oxide formed by incineration is neutralized by adding 100 ml of N/10 H₂SO₄ to it. Then, the excess of H₂SO₄ is titrated by N/10 NaOH using phenolphthalein as indicator. By putting the titre A ml thus obtained into the following calculation formula, DS value is obtained.

$$DS = \frac{162 \times (100 f_1 - A f_2)}{10000 - 80(100 f_1 - A f_2)}$$

$f_1$: factor of N/10H₂SO₄

$f_2$: factor of N/10NaOH (2) DS by carboxymethyl group in free acid form and DS by esterified carboxymethyl group (of an esterified CMC)

1 g of an esterified CMC is precisely weighed and dissolved in 200 g of acetone. Titration is carried out rapidly with N/10 NaOH using phenolphthalein as indicator. The titre B ml is noticed when the red color does not disappear for 5 or more seconds. Addition of N/10 NaOH are added in total. The mixture is stirred at room temperature for 2 hours to saponify the ester.

Next, back titration is carried out with N/10 H₂SO₄ and the titre C ml is noticed. DS by carboxymethyl group in free acid form and DS by esterified carboxymethyl group are obtained according to the following formula:

DS by carboxymethyl group in free acid form of an esterified CMC=DS by carboxymethyl group of the starting $$CMC \times \frac{B f_2}{(100 f_2 - C f_1)}$$

$f_1$: factor N/10H$_2$SO$_4$ $f_2$: factor of N/10NaOH

DS by esterified carboxymethyl group of an esterified CMC=DS by carboxymethyl group of the starting CMC−DS by carboxymethyl group in free acid form of the esterified CMC (3) Degree of polymerization Degree of polymerization is calculated by measuring molecular weight according to the osmotic pressure method. Solvents used for the measurement are 0.25N NaCl aqueous solution for sodium CMC and THF for esterified CMC.

(4) Infrared absorption spectrum

Esterified CMC is dissolved in acetone to form 5% solution. The solution is poured and spread on a glass plate. After drying in atmosphere, the plate is dried at about 80° C. for 2 hours. Measurement of infrared absorption spectrum is effected using the film thus prepared.

What is claimed is:

1. An esterified carboxymethyl cellulose which is soluble in an organic solvent, wherein the degree of substitution by carboxymethyl group per anhydroglucose unit is 2.00 or more, the ester group is a hydrocarbon residue having 1 to 8 carbon atoms, the degree of substitution by the esterified carboxymethyl group per anhydroglucose unit is 1.50 or more, the remaining unsubstituted carboxymethyl groups are in the form of the free acid, and the degree of polymerization is 20 to 700.

2. The esterified carboxymethyl cellulose of claim 1, wherein the hydrocarbon residue is methyl group, ethyl group, n-propyl group, iso-propyl group, n-butyl group, sec-butyl group, tert-butyl group, n-pentyl group, n-hexyl group, n-heptyl group, n-octyl group, benzyl group or cyclohexyl group.

3. The esterified carboxymethyl cellulose of claim 1, wherein the hydrocarbon residue is methyl or ethyl group.

4. The esterified carboxymethyl cellulose of claim 1, wherein the hydrocarbon residue is n-octyl group.

5. The esterified carboxymethyl cellulose of claim 1, wherein the hydrocarbon residue is benzyl group.

6. The esterified carboxymethyl cellulose of claim 1, wherein the degree of substitution by carboxymethyl group is in the range of 2.0 to 3.0, and the degree of substitution by the esterified carboxymethyl group is in the range of 1.5 to 3.0.

7. The esterified carboxymethyl cellulose of claim 1, wherein said organic solvent is dimethylsulfoxide, tetrahydrofuran, acetone, acetylacetone, n-hexane or benzene, in an amount of at least 1%.

8. The esterified carboxymethyl cellulose of claim 1, wherein the degree of substitution by carboxymethyl group is in the range of 2.0 to 2.9 and the degree of substitution by the esterified carboxymethyl group is in the range of 1.5 to 3.0.

9. The esterified carboxymethyl cellulose of claim 1, wherein the degree of substitution by carboxymethyl group is in the range of 2.0 to 3.0 and the degree of substitution by the esterified carboxymethyl group is in the range of 1.5 to 2.9.

10. The esterified carboxymethyl cellulose of claim 1, wherein the degree of substitution by carboxymethyl group is in the range of 2.0 to 2.9 and the degree of substitution by the esterified carboxymethyl group is in the range of 1.5 to 2.9.

* * * * *